UNITED STATES PATENT OFFICE.

J. B. HYDE, OF NEWARK, NEW JERSEY.

IMPROVEMENT IN MANUFACTURE OF MANURE FROM FISH.

Specification forming part of Letters Patent No. 33,706, dated November 12, 1861.

*To all whom it may concern:*

Be it known that I, J. B. HYDE, of Newark, in the county of Essex and State of New Jersey, have invented a new and useful Improvement in the Manufacture of Manure from Fish; and I do hereby declare the following to be a full and exact description thereof.

In the manufacture of manure from fish it is usual to digest or boil in open or closed vessels until the fish are cooked, or so changed by heat that the flesh, blood, and albuminous portions are reduced to a pulpy mass and will not decompose when exposed to the air. The boiling also bursts the oil-cells, setting the oil free. This mass is next placed in tanks with an excess of water, upon the surface of which the oil rises and is skimmed or drawn off, while the solid portions settle to the bottom. The supernatant fluid is then drawn off from the sediment, composed of the bones and fleshy portions of the fish, which is removed and dried, when it is ready for use as manure. In other cases the pulpy mass is placed under pressure direct from the boilers, which quickly discharges the oil and watery portions, leaving the pulp nearly free from moisture, which is readily dried by spreading, and thus is ready for use.

The decomposition of this solid matter, when thus prepared and placed upon land, is not uniform. The softer fleshy portions, containing the ammonia, are soon decomposed, whereas the bony portions, containing the phosphate of lime, are not reduced until the following year, which leads to a great waste of the fertilizing property of the manure. This want of uniform decomposition and partial slowness of the process has suggested the plan of thoroughly drying the pulp, and then grinding it to powder, converting it into a material called "artificial guano." Serious impediments have, however, attended the grinding of this pulp or pomace, arising particularly from the difficulty of entirely freeing it from oil or thoroughly drying it, both or either of which cause the pulp to become of paste-like consistency when in the mill and prevent the grinding desired.

The nature of my improvement consists in mixing dried peaty matter with the pulp previous to the grinding process, the object of which is threefold: First, peat, being very hygrometric, will absorb such moisture as may remain in the pulpy flakes of the fishy matter without changing the consistency of the peat, thereby greatly facilitating complete desiccation and insuring the reduction of the entire mass to fine powder by grinding; second, peat having a great affinity for ammonia, it will absorb all this gas, which would otherwise, to a great degree, be set free and lost; and, third, the peat powder being itself a useful fertilizer, while it adds but slightly to the cost of the fishy product, affords the best possible medium as a corpus for the rich fish-manure.

I prefer peaty matter freed from leaves and fibers. It should be dug from its bed and thoroughly dried, then be well mixed with equal measures of the dried-fish pomace, and afterward ground to powder. An excess quantity of peat may be used as well. The peat will entirely deodorize the fish-manure, retaining the gases for enriching the soil.

When peat is not convenient dried marl or clay or plaster may be used in the same way, as a good substitute to mix with the fishy pulp for the purpose of reducing the same to powder by grinding the mixture; but when peaty matter can be procured that substance is far preferable.

What I claim, and wish to secure by Letters Patent, is—

The mixing of peat, marl, clay, and plaster, or either or any of said materials, with fish pulp or pomace, for effectually grinding or pulverizing said mixture.

J. B. HYDE.

Witnesses:
   J. J. MACDONALD,
   JOHN CAMPBELL.